US010457026B2

(12) United States Patent
Mühlhause et al.

(10) Patent No.: US 10,457,026 B2
(45) Date of Patent: Oct. 29, 2019

(54) DEVICE AND METHOD FOR PRODUCING COMPOSITE SHEETS USING MULTIPLE LAMINATION

(71) Applicants: ThyssenKrupp Steel Europe AG, Duisburg (DE); ThyssenKrupp AG, Essen (DE)

(72) Inventors: Walter Mühlhause, Geldern (DE); Oliver Kleinschmidt, Dortmund (DE); Klaus Peter Koch, Schwelm (DE); Klemens Heermann, Dorsten (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 204 days.

(21) Appl. No.: 15/327,604

(22) PCT Filed: Jun. 24, 2015

(86) PCT No.: PCT/EP2015/064200
§ 371 (c)(1),
(2) Date: Jan. 19, 2017

(87) PCT Pub. No.: WO2016/012182
PCT Pub. Date: Jan. 28, 2016

(65) Prior Publication Data
US 2017/0182755 A1    Jun. 29, 2017

(30) Foreign Application Priority Data
Jul. 21, 2014 (DE) .................. 10 2014 110 252

(51) Int. Cl.
B32B 37/00    (2006.01)
B32B 15/08    (2006.01)
(Continued)

(52) U.S. Cl.
CPC .......... *B32B 37/0046* (2013.01); *B32B 15/08* (2013.01); *B32B 15/20* (2013.01);
(Continued)

(58) Field of Classification Search
CPC ..... B32B 15/08; B32B 15/085; B32B 15/088; B32B 2250/03; B32B 2250/40;
(Continued)

(56) References Cited

U.S. PATENT DOCUMENTS 3,725,169 A    4/1973 Allen et al.
4,601,941 A *  7/1986 Lutz .................. B32B 15/08
                                                428/213
(Continued)

FOREIGN PATENT DOCUMENTS

CN    1211503 A    3/1999
CN    102452209 A  5/2012
(Continued)

OTHER PUBLICATIONS

Avril et al. New Poymer Materials for Steel/Polymer/Steel Laminates in Automotive Applications, Macromolecular Materials and Engineering, vol. 298, Issue 6, dated Aug. 27, 2012.
(Continued)

*Primary Examiner* — Carson Gross
(74) *Attorney, Agent, or Firm* — Lathrop Gage L.L.P.

(57) ABSTRACT

A device for producing a strip-shaped composite sheet may comprise at least two outer metal cover sheets and at least one plastic layer disposed between the two outer metal cover sheets. The device may further comprise at least one first laminating device for laminating the metal cover sheets with the at least one plastic layer arranged between the metal cover sheets, with the first laminating device comprising at least two laminating rolls forming a laminating gap. One object of the present disclosure is to provide methods and
(Continued)

devices for producing composite sheets, with which the economy, in particular the production speed, of the production method can be significantly increased and at the same time the risk of delamination of the composite sheets during the further processing can be reduced.

19 Claims, 3 Drawing Sheets

(51) Int. Cl.
  *B32B 37/06* (2006.01)
  *B32B 37/08* (2006.01)
  *B32B 37/20* (2006.01)
  *B32B 15/20* (2006.01)
  *B32B 27/20* (2006.01)
  *B32B 27/32* (2006.01)
  *B32B 27/34* (2006.01)
  *B32B 15/088* (2006.01)
  *B29C 35/08* (2006.01)
  *B32B 15/085* (2006.01)

(52) U.S. Cl.
  CPC ............. *B32B 27/20* (2013.01); *B32B 27/32* (2013.01); *B32B 27/34* (2013.01); *B32B 37/06* (2013.01); *B32B 37/08* (2013.01); *B32B 37/203* (2013.01); *B29C 2035/0838* (2013.01); *B32B 15/085* (2013.01); *B32B 15/088* (2013.01); *B32B 2250/03* (2013.01); *B32B 2250/40* (2013.01); *B32B 2250/42* (2013.01); *B32B 2270/00* (2013.01); *B32B 2605/08* (2013.01)

(58) Field of Classification Search
  CPC ..... B32B 27/32; B32B 27/34; B32B 2605/08; B29C 2035/0838
  USPC .......................................................... 156/311
  See application file for complete search history.

(56) References Cited

U.S. PATENT DOCUMENTS

| | | | | |
|---|---|---|---|---|
| 5,306,566 | A | * | 4/1994 | Bottema .............. B23K 20/021 428/461 |
| 2010/0233505 | A1 | * | 9/2010 | Boger .................. B29C 44/326 428/613 |
| 2012/0064293 | A1 | * | 3/2012 | Siemen .................... B05D 1/40 428/141 |
| 2016/0114562 | A1 | * | 4/2016 | Pilcher ...................... B32B 5/18 428/215 |

FOREIGN PATENT DOCUMENTS

| | | | |
|---|---|---|---|
| DE | 2233958 | A | 2/1973 |
| JP | S5441975 | A | 4/1979 |
| JP | S60230847 | A | 11/1985 |
| JP | S61193850 | A | 8/1986 |
| JP | 2014144117 | A | 8/2014 |
| WO | 91/12135 | A1 | 8/1991 |
| WO | 94/29106 | A1 | 12/1994 |
| WO | 2009/043777 | A2 | 4/2009 |
| WO | 2010/108953 | A1 | 9/2010 |

OTHER PUBLICATIONS

International Search Report for PCT/EP2015/064200 (dated Sep. 10, 2015).
English Language Abstract for DE 2233958 A.

* cited by examiner

DEVICE AND METHOD FOR PRODUCING COMPOSITE SHEETS USING MULTIPLE LAMINATION

CROSS REFERENCE TO RELATED APPLICATIONS

This application is a U.S. National Stage Entry of International Patent Application Serial Number PCT/EP2015/064200, filed Jun. 24, 2015, which claims priority to German Patent Application No. DE 10 2014 110 252.5 filed Jul. 21, 2014, the entire contents of both of which are incorporated herein by reference.

FIELD

The present disclosure generally relates to devices and methods for producing strip-shaped composite sheets.

BACKGROUND

Composite sheets consisting of two metal cover sheets with a plastics layer arranged between the metal cover sheets, also called sandwich sheets, have an enormous weight-saving potential in comparison to the, for example, solid material steel sheets customarily used in motor vehicle manufacturing. For example, a sandwich sheet with a layer sequence of steel/plastic/steel and the following thicknesses of 0.5 mm/1 mm/0.5 mm has virtually the same bending properties in comparison to an identical monolithic variant with a thickness of 1.91 mm. However, the composite sheet or sandwich sheet has a weight which is up to 40% lower. In order to produce corresponding composite sheets, use has hitherto been made of laminating devices in the form of double belt presses which also comprise a laminating device. The metal strips provided for the metal cover sheets and the plastics film provided for the plastics layer are supplied continuously to the double belt press. In the double belt press, the metal strips and the plastics film are initially brought in a heating up zone to a laminating temperature before they are guided into a laminating device arranged within the double belt press. The laminating device which is arranged in the double belt press and is in the form of a calender produces the final adhesion between metal sheets and plastics layer by means of the high line pressure, followed by a cooling zone which is likewise formed by a double belt press and in which the strip-shaped composite sheet is cooled. Different cooling temperatures and cooling rates can be set in the cooling zone. In the double belt presses, the transport of heat both in the heating up zone and in the cooling zone takes place by direct or indirect contact with aluminum plates which move along at the belt speed or are arranged in a stationary manner. So that the surface of the composite sheet is not damaged, a transport belt which moves along is required between the stationary aluminum plates and the composite sheet. It has been shown that the production speeds of the corresponding, known device have hitherto been insufficient in order to obtain a high degree of economy in the production process. Furthermore, it is a constant requirement to increase the adhesion between metal sheets and plastics layer in order to prevent delamination between the metal layers and plastics layer, for example when further processing the composite sheets.

International patent application WO 2009/043777 A2 discloses a method for producing a composite sheet with two outer metal cover sheets and a plastics layer arranged between the cover sheets, in which, as explained, double belt presses are used for producing the composite sheet.

DETAILED DESCRIPTION

Figure 1:
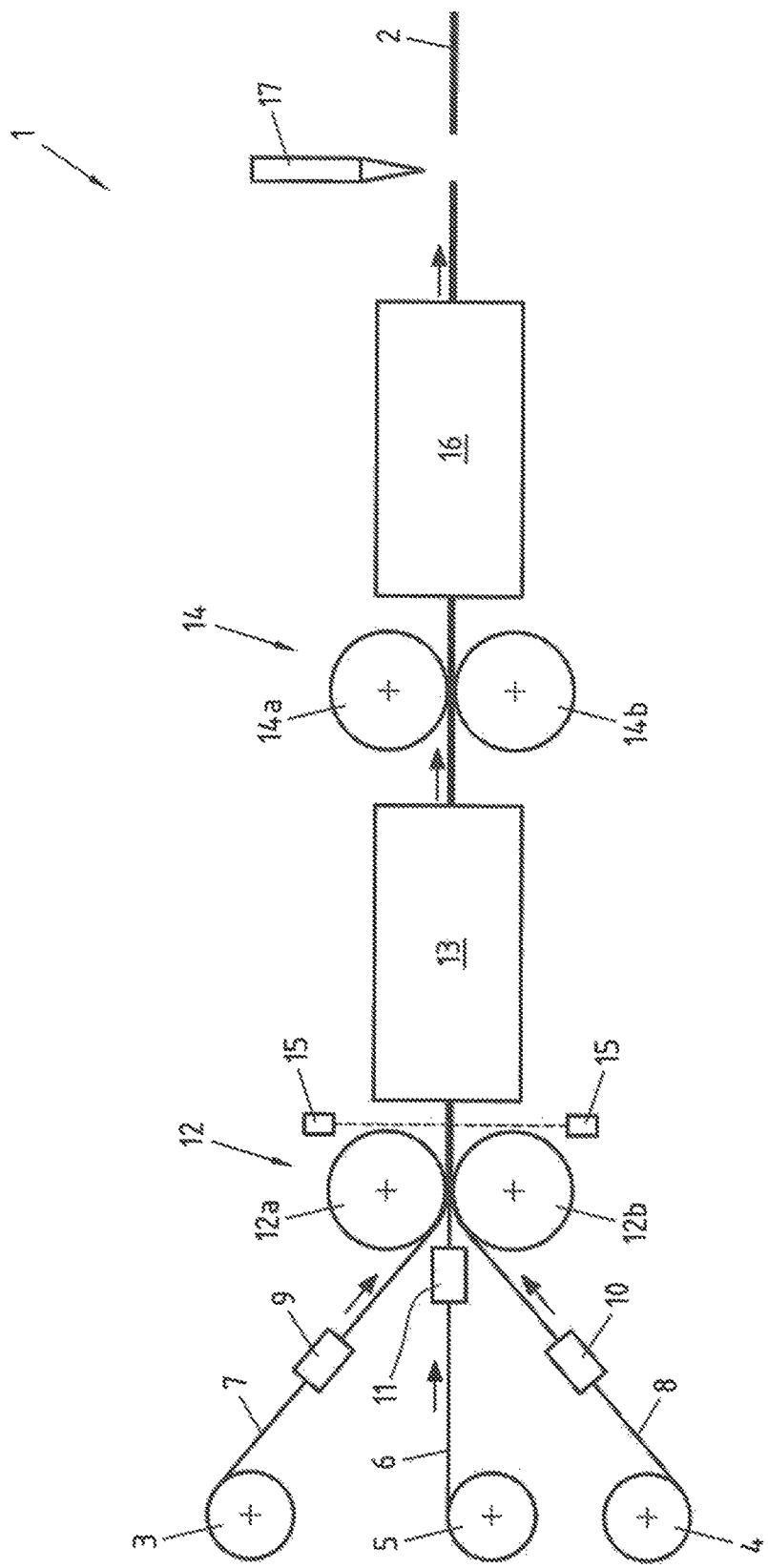
FIG. 1 is a schematic sectional view of an example device for producing a composite sheet with two laminating devices.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure concerns methods and devices for producing composite sheets, with which the economy, that is to say the production speed, can be significantly increased and at the same time the risk of delamination of the composite sheets during further processing can be reduced. To that end, the present disclosure generally concerns devices for producing a strip-shaped composite sheet that comprises at least two outer metal cover sheets and at least one plastics layer arranged between cover sheets, comprising at least one first laminating device for laminating the metal cover sheets with the at least one plastics layer arranged between the metal cover sheets to form the composite sheet, said laminating device comprising at least two laminating rolls forming a first laminating gap. In addition, the present disclosure generally concerns methods for producing a strip-shaped composite sheet comprising at least two metal cover sheets and at least one plastics layer arranged between the cover sheets. In some examples, the method may comprise providing at least two metal strips and at least one plastics film by means of unwinding reels, preheating the metal strips and the plastics film before they are supplied to a first laminating device with a laminating gap formed by two laminating rolls, and laminating the at least two metal strips with the at least one plastics film arranged between the metal strips in the first laminating device to form a composite sheet.

According to a first teaching of the present invention, this object is achieved for a device of the type in question for producing a strip-shaped composite sheet in that in the process direction downstream of the first laminating gap, a first heating up zone is provided with heating means for reheating the composite sheet after the first laminating step in the first laminating gap to a laminating temperature, and a second laminating device is arranged in the process direction downstream of the first heating up zone, said laminating device comprising a second laminating gap formed by at least two laminating rolls, and a cooling zone is arranged downstream of the second laminating gap.

There is no longer the necessity in the case of the device according to the invention to use double belt presses for the actual laminating operation, i.e. double belt presses with an integrated laminating device, and therefore the production speed can be increased. The connection between the metal cover sheets and the plastics layer is provided by means of the laminating rolls both of the first laminating device and of the downstream, second laminating device. Both the first laminating device and the second laminating device can carry out the laminating process between the metal sheets and the plastics layer at a higher production speed.

According to a first refinement of the device according to the invention, a respective unwinding reel is provided for unwinding at least two metal strips in order to provide the metal cover sheets, at least one unwinding reel is provided for unwinding at least one plastics film in order to provide the at least one plastics layer, and means are provided for preheating the at least two metal strips and the at least one plastics film before the first laminating step to form the composite sheet. However, it is also conceivable to provide the plastics layer in the form of a product by the piece. The metal strips are preferably preheated to a temperature of 100° C. to 300° C. via the means for preheating the at least two metal strips. The plastics film is preferably preheated to a temperature of 50° C. to 150° C.

During the preheating of the metal strips, the latter can be heated inductively, for example by means of transverse field or longitudinal field induction, conductively, for example by resistance heating between two rollers, with a convection oven and hot air, an infrared emitter or near infrared emitter (NIR emitter), line lasers or else laser diodes, with the use of gas ejectors or gas burners, indirectly or directly or by contact heating via heatable rollers moving along therewith. For example, during the preheating, no plastic deformation occurs, so as to be able to produce a composite sheet which is as dimensionally stable as possible.

The plastics layer is brought to laminating temperature, for example, via a convection oven using hot air, an infrared emitter or gas ejectors, in particular indirect gas ejectors or gas burners or else by contact heating via heatable rolls moving along therewith.

According to a first alternative refinement of the device according to the invention, at least one unwinding reel is provided for unwinding at least one metal strip in order to provide the at least one metal cover sheet, at least one unwinding reel is provided for unwinding at least one metal strip with a plastics film laminated thereon at least on one side, and means are provided for preheating the at least one metal strip with the plastics film laminated thereon at least on one side and the at least one metal strip before the first laminating step to form the composite sheet. By means of this alternative embodiment, the laminating step can be simplified since the plastics film has already been laminated onto a metal strip.

According to a second alternative refinement of the device according to the invention, a respective unwinding reel is provided for unwinding at least two metal strips in order to provide the metal cover sheets, at least one unwinding reel is provided for unwinding at least one plastics film in order to provide the at least one plastics layer, and means are provided for preheating the at least one metal strip and the at least one plastics film before a laminating-on step in order to produce a metal strip with a plastics film laminated thereon at least on one side. Furthermore, in the process direction downstream of the laminating-on step, means are provided for preheating the at least one metal strip with the plastics film laminated thereon at least on one side and at least one further metal strip before the first laminating step to form the composite sheet.

According to a further refinement of the device according to the invention, means are provided for heating the metal cover sheets of the composite sheet downstream of the first laminating gap. The means for heating the metal cover sheets of the composite sheet are preferably provided directly downstream of the first laminating gap since customarily tensions occur in the composite sheet during the laminating process. When the cover sheets and the plastics films run through the laminating gap, temperature-induced changes of the width, in particular of the plastics layer, typically occur, and therefore stresses arise during cooling of the composite sheet. In order to avoid said stresses, means for heating the metal cover sheets of the composite sheet are used downstream of the first laminating gap and heat the cover sheets in a targeted manner.

Preferably, radiative heating means, lasers or LEDs are provided as the means for heating the metal cover sheets of the composite sheet downstream of the first laminating gap. Radiatively and therefore contactlessly operating heating means have the advantage that they not only do not cause any damage to the surfaces, but also can transmit very precisely metered quantities of energy to the metal cover sheets from the outside. Use is preferably made here of line lasers or else laser diodes, and therefore, as a result, very precise heating of the cover sheets directly after they exit from the laminating gap can take place. However, other radiative heating means, such as, for example, NIR emitters, are also conceivable.

According to a further refinement of the present invention, a heat tunnel in which the composite sheet is radiatively, inductively and/or convectively heated to the laminating temperature is provided in the first heating up zone. Radiative, inductive and convective heating in a heat tunnel, that is to say in a spatial region closed off, for example, by means of an enclosure, can ensure heating of the composite sheet in a suitable manner or process-specific manner, and therefore said composite sheet can also be supplied to a further laminating step at a higher process speed.

Alternatively thereto, a double belt press for the conductive heating of the composite sheet can also be provided in the first heating up zone. The double belt press operates with temperature-adjusted aluminum plates which are placed thereon and transmit the heat to the composite sheet. In order to avoid surface errors or to avoid damage of the surface, a belt is arranged between the aluminum plates and the surface of the composite sheet and moves along therewith. Even double belt presses can reach a relatively high production speed during the heating up operation if they are not additionally intended to carry out a laminating step. In this respect, a heating up zone which, according to the present embodiment, may be a double belt press for inductive heating, also assures an identically high production speed.

According to a further refinement of the device, a cooling zone is arranged downstream of the second laminating gap, wherein the cooling zone is designed as a double belt press, an air cooling section, a water mist cooling section, a water cooling section or a combination of the cooling sections mentioned. The controlled cooling of the strip-shaped composite sheet ensures that the composite sheet can be supplied as rapidly as possible to the further processing steps, for example to assembling.

According to a further refinement, the outlay on apparatus for providing the means for preheating the at least two metal strips can be reduced in that the strip-guiding means are provided for the metal strips, with which the metal strips can be guided through the first heating up zone of the composite sheet for preheating downstream of the first laminating gap, and therefore the heat in the heating up zone downstream of the first laminating gap can also be implemented for preheating the metal strips before the first laminating step. For example, use can be made here of a first heating up zone which has a plurality of heating up regions which has separate heating up regions for the preheating upstream of the first lamination and for the heating up process downstream of the first lamination. A particularly compact construction of the device according to the invention is therefore additionally obtained.

According to a further refinement, the means for preheating the plastics film are arranged directly upstream of the laminating gap of the first laminating device, and therefore the temperature loss up to entry into the laminating gap is particularly small, and therefore particularly controlled laminating temperatures of the plastics film can be set and maintained in the laminating gap.

If at least one further heating up zone with a further laminating device which is arranged on the output side of the further heating up zone and has at least two laminating rolls forming a laminating gap is provided upstream of the cooling zone in the process direction, the adhesion between the cover sheets and the plastics layer arranged in between can be further increased by also time-dependent processes improving the adhesive effect being able to be used by the further laminating device. Overall, despite a higher process speed, a further increase in the adhesion between the metal sheets and the plastics layer can be achieved.

In all, or at least in one, of the laminating devices used, temperature-adjustable laminating rolls are preferably provided since the latter can ensure a particularly controlled buildup of connections in respect of the lamination. Owing to the set temperature of the laminating rolls, which corresponds, for example, to the temperature of the cover sheets in the preheating or heating up process, relative movements between the metal strips and plastics layer can be avoided.

According to a second teaching of the present invention, the indicated object is achieved by a method in that the composite sheet is heated again in a first heating up zone downstream of the first laminating gap to a laminating temperature, is subjected in a second laminating device, which comprises at least two laminating rolls forming a laminating gap, to a second laminating step and is cooled in a cooling zone. As already explained previously, the process speed can be significantly raised by the division into a first laminating step, a prelaminating step and into a second laminating step. In addition, the effect achieved by the controlled cooling in the cooling zone is that the composite sheet can be supplied directly after the production thereof to a further processing step, for example for trimming or assembling.

If the metal cover sheets of the metal composite sheet are radiatively heated after passing through the first laminating gap, the cover sheets can be heated, for example directly at the outlet of the first laminating gap, and therefore stresses arising due to temperature differences between the metal strips and the plastics layer are avoided or compensated for in the composite sheet. For example, lasers, in particular line lasers or LEDs, are used as the radiative heating means. The two heating means can heat very precise, specific regions of the metal cover sheets with a wavelength coordinated, for example, to the absorption behavior of the metal cover sheets. The heating can be introduced spatially very precisely if lasers, for example laser diodes or line lasers, are used. However, the use of IR or NIR emitters on the output side of the laminating gap is also conceivable. The cover sheets can also be heated, for example, downstream of each laminating device in the production process.

If, according to a further refinement of the method, after the second laminating step, the composite sheet passes through at least one further heating up zone with a further laminating device arranged on the output side of the further heating up zone, before the composite sheet is cooled in the cooling zone, the laminating process can be divided, for example, between a total of three or more laminating steps. By this means, the adhesion capability between the metal sheets and the plastics layer and the production speed can be increased on the one hand.

If, according to a further refinement of the method, the at least two metal strips are guided for preheating through the first heating up zone, which is provided downstream of the first laminating gap, and are laminated in the first laminating gap to form a composite sheet, not only can a compact construction of the device be ensured, but also an energetically advantageous method can be provided by using the energy of the first heating up zone.

If the at least one plastics film is heated, preferably to a temperature of between 50° C. and 150° C., by heating means directly before entry into the first laminating gap, not only can a particularly controlled laminating process be achieved because of the reduced heat loss of the plastics film, but also the risk of tearing of the plastics film can be reduced since the length in which the plastics film has the increased temperature can thus be minimized. The metal strips are preferably preheated or reheated to a temperature of 100° C. to 300° C. in order to permit optimum lamination of the plastics layer.

According to a refinement of the method, the temperature of at least two laminating rolls of a laminating gap is preferably adjusted to the temperature of the heated metal strips before the respective laminating step. The effect achieved by this is that the heat of the metal strips cannot flow off via the laminating rolls, but rather merely via the plastics film arranged between the two metal strips. As a result, the laminating step is highly controlled when correspondingly temperature-adjusted laminating rolls are used.

FIG. 1 shows, in a schematic sectional view, a device 1 for producing a strip-shaped composite sheet 2, where the composite sheet comprises at least two outer metal cover sheets and at least one plastics layer arranged between the cover sheets. The metal cover sheets are provided as metal strips 7, 8 via the unwinding reels 3 and 4, and the plastics layer is provided by a plastics film 6 via the unwinding reel 5. The metal strips 7, 8 are supplied to preheating means 9, 10 which heat the metal strips, for example, inductively, conductively, convectively and/or radiatively. The conductive heating can take place here both using electric current and also by direct heat contact, i.e. via heat conduction. The plastics film 6 is also supplied to preheating means 11 before the first laminating step, said preheating means preferably being arranged directly in the vicinity of the laminating gap of the first laminating device 12.

The plastics film is preheated, for example, convectively, radiatively or conductively via direct heat contact, for example using temperature-adjusted contact rolls. The preheated metal strips 7, 8 and the preheated plastics film 6 are supplied to the first laminating device 12 which comprises two laminating rolls 12a, 12b forming a laminating gap. The laminating pressure for the two metal strips 7, 8 and the plastics film 6 can be set via the distance between the laminating rolls 12a and 12b, that is to say by the laminating gap. Suitable plastics are in particular thermoplastics, for example a blend of a polyamide and a polyethylene. Fiber-reinforced plastics can also be used. The plastics are preferably temperature resistant up to 200° C. in order, for example, to withstand downstream painting and drying steps without deformation or another change. The metal strips are preferably composed of a steel and have, for example, a thickness of 0.1 mm to 0.8 mm. Differing steel alloy and/or thicknesses and also combinations with other materials or of other materials, such as, for example, aluminum alloys and/or magnesium alloy, can likewise be used. The thickness of the plastics layer of the finished composite sheet is, for example, 0.3 mm to 2.5 mm.

The device illustrated in FIG. 1 comprises, downstream of the first laminating device 12 in the process direction, a first heating up section 13, at the output of which a second laminating device 14 is arranged. In the heating up zone 13, the composite sheet is heated again in a suitable manner or process-specifically to a laminating temperature, for example of 100° C. to 300° C., and is relaminated in the laminating gap formed by the two laminating rolls 14a, 14b. By this means, the adhesion between the metal strips 7, 8 and the plastics layer consisting of the plastics film 6 is increased further.

At the same time, no double belt presses are used for providing the connection between the two materials, metal and plastic, since the connection is produced in each case in the laminating gaps. As a result, the production speed increases significantly. The heating up zone 13 heats the composite sheet 2, after the latter has passed through the first laminating device 12, generally convectively, radiatively or via contact heating, for example with heatable rolls. In addition, means 15 can be provided for heating the metal cover sheets of the composite sheet downstream of the first laminating gap, said means being designed in the present example as a laser beam source, for example diode laser or line laser.

The means 15 for heating the metal cover sheets directly after the first laminating step or downstream of the laminating device 12 make it possible for the metal cover sheets 7, 8 to be reheated and thus for stresses which have been introduced into the composite sheet by the laminating device 12 to be able to be compensated for or eliminated. The additional heating of the metal strips 7, 8 via the heating means 15 leads to a heat flow out of the metal strips into the plastics layer 6, and therefore the stresses are compensated for because of different temperatures of metal strip 7, 8 and plastics layer 6. Temperature-adjusted laminating rolls 12a, 12b, the temperature of which is preferably adjusted to the metal strip temperature, additionally act here in an assisting manner.

After the composite sheet has passed through the second laminating step in the laminating device 14, the still strip-shaped composite sheet is cooled in a controlled manner in a cooling zone 16 and supplied to a further processing station 17 which cuts composite sheets 2 out of the strip. Similarly, coiling of the strip-shaped composite sheet is conceivable. As indicated in FIG. 1, the first heating up zone is designed as a heat tunnel and heats the composite sheet radiatively, inductively and/or convectively to a laminating temperature, for example within the range of 100° C. to 300° C.

The cooling zone 16 can also be designed, for example, as a double belt press, air cooling section, water mist cooling section or water cooling section or as a combination of the cooling sections mentioned. By this means, the sheet is cooled down after its production to a temperature at which the composite sheet can be readily further processed, for example by an assembling device 17.

Figure 2:
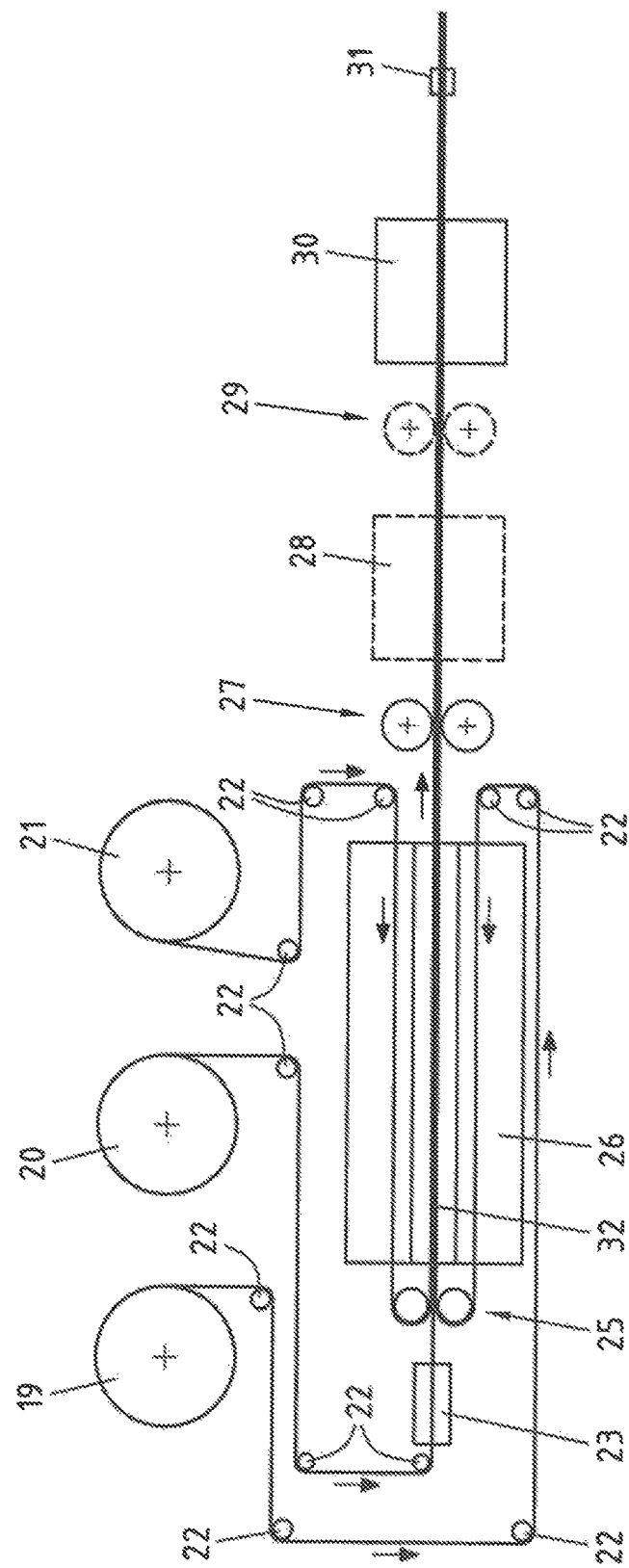
FIG. 2 is a schematic sectional view of another example device for producing a composite sheet with at least two laminating devices.

FIG. 2 now shows a further exemplary embodiment of a device which first of all comprises unwinding reels 19, 20 and 21 for each of the metal strips and the plastics film. A plastics film is unwound from the unwinding reel 20 and supplied via strip-guiding means 22 for preheating 23 arranged directly upstream of the first laminating device 25. The effect which can be achieved by this arrangement of the preheating of the plastics film is that the plastics film can be subjected to the first laminating step at a particularly precisely controlled temperature.

The metal strips are unwound from the unwinding reels 19 and 21 and guided via strip-guiding means 22 through the heating up zone 26 of the device and heated at the same time with the composite sheet to the laminating temperature. After exiting from the heating up zone 26, the metal strips are guided together with the plastics film from the unwinding reel 20 into the first laminating gap of the first laminating device 25 and are connected there to form a strip-shaped composite sheet 32. By this means, a particularly compact construction of the device for producing a composite sheet is achieved since in particular an additional preheating section for the metal strips can be dispensed with. After the first laminating step in the first laminating device 25, the composite sheet passes through the heating up zone 26 in the direction of a further laminating device 27. At the end of the first heating up zone 26, the composite sheet has a laminating temperature which lies between 100° C. and 300° C. The composite sheet 32 is relaminated.

The composite sheet subsequently passes, for example, through a double belt press 28 which is designed as a second heating up zone which reheats the composite sheet to the laminating temperature. A further laminating device 29 on the output side of the second heating up zone 28 carries out a further laminating step and increases the adhesion between the cover sheets and the plastics layer. Therefore, in particular also time-dependent adhesive mechanisms are usable during the production of the composite sheets in order to improve the adhesion between metal strips and plastics layer. On the output side of the third laminating device 29, for example, a cooling zone 30 which is likewise designed as a double belt press is provided, said cooling zone cooling the strip to a processing temperature in a controlled manner, and therefore the strip-shaped composite sheet 32 can be assembled at the working station 31, for example in the sheets or can be coiled in the form of a coil. If required, the second heating up zone 28 and the third laminating device 29 can be dispensed with and therefore they are shown in FIG. 2 as dashed lines.

The temperature of the laminating rolls provided in the laminating devices 25, 27, 29 is preferably adjusted, specifically to the temperature of the metal cover sheets or of the metal strips, and therefore heat is not transported out of the metal strips in the direction of the laminating rolls. By this means, the temperature difference between the metal strips and the plastics film during the laminating process can be kept small, and therefore the laminating process as a whole is more controlled. By means of the, for example, three laminating steps in the first, second and optionally third laminating device, it is possible to raise the production speed and to obtain an increased processing speed. By this means, it is possible to economically produce composite sheets with at least two metal cover sheets and a plastics layer arranged between the cover sheets.

Figure 3:
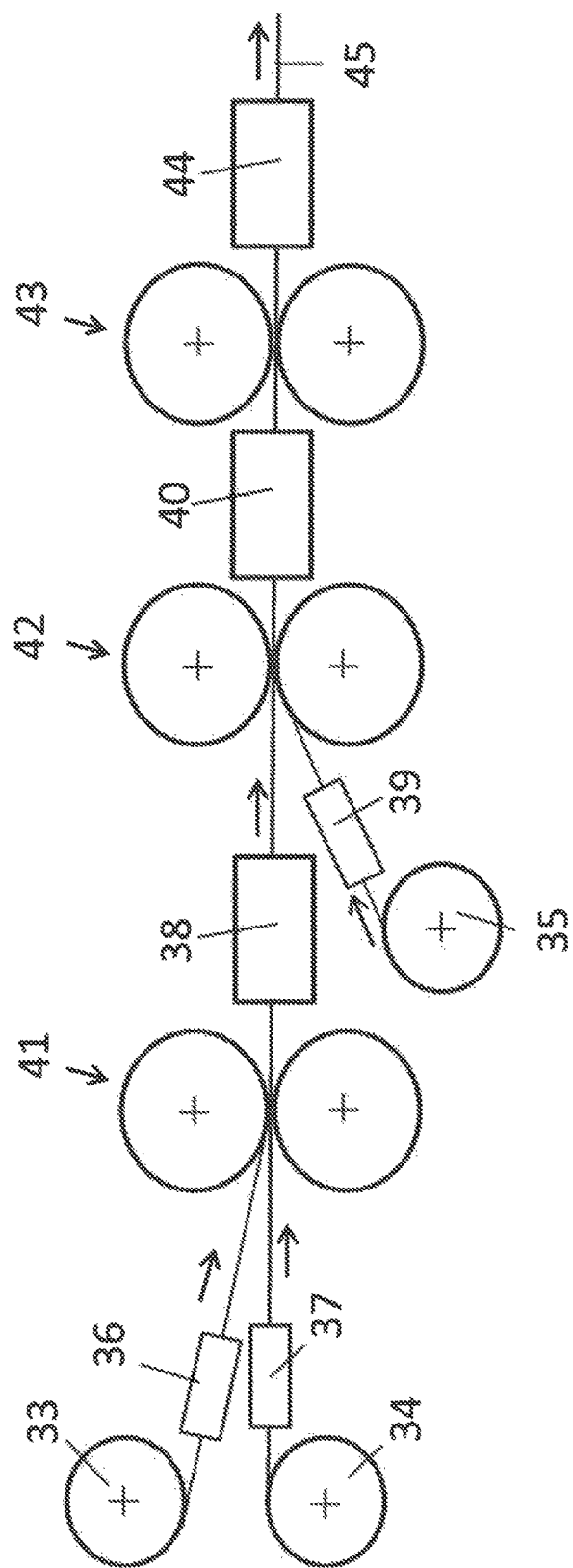
FIG. 3 shows a third exemplary embodiment of a device for producing a composite sheet with at least two laminating devices, in a schematic sectional view.

FIG. 3 shows a further exemplary embodiment of a device which first of all comprises unwinding reels 33, 34 and 35 for each of the metal strips and for the plastics film. A metal strip and a plastics film are first of all unwound from the unwinding reels 33 and 34 and supplied to the preheating means 36, 37. The preheated metal strip and the preheated plastics film are supplied to a laminating device 41 comprising a laminating gap, in order, in a laminating step, to produce a metal strip with the at least one plastics film laminated thereon on one side. The metal strip is supplied in the process direction together with at least one plastics film laminated thereon on one side to the preheating means 38. A further metal strip is unwound from the unwinding reel 35 and supplied to the preheating means 39 before the metal strip is supplied to a laminating device 42 comprising a laminating gap, wherein the metal strip together with the preheated metal strip, which comprises at least one plastics film laminated thereon on one side, is introduced into the laminating device 42 in order to produce a composite sheet 45 in a first laminating step. A heating up zone 40 follows downstream of the first laminating device 42 in the process direction, at the output of which heating up zone a second laminating device 43 is arranged. The composite sheet 45 is heated again in the heating up zone 40 in a suitable manner or process-specifically to a laminating temperature, for example of 100° C. to 300° C., and is relaminated in the laminating device 43. By this means, the adhesion between the metal strips and the plastics film is further increased.

After the composite sheet has passed through the second laminating step in the laminating device 43, the still strip-shaped composite sheet is cooled in a controlled manner in a cooling zone 44 and supplied to a further processing station (not illustrated) which, for example, cuts composite sheets out of the strip. Coiling of the strip-shaped composite sheet is also conceivable.

What is claimed is:

1. A device for producing a strip-shaped composite sheet that includes a plastic film disposed between two outer metal cover sheets, the device comprising:
    a first laminating device for laminating the plastic film between the two outer metal cover sheets, wherein the first laminating device includes two laminating rolls forming a first laminating gap;
    a first heating zone positioned downstream of the first laminating gap, the first heating zone including heating means for heating the plastic layer film and the two outer metal cover sheets after a first laminating step in the first laminating gap to a laminating temperature;
    a second laminating device positioned downstream of the first heating zone, wherein the second laminating device includes two laminating rolls forming a second laminating gap; and
    a cooling zone positioned downstream of the second laminating gap.

2. The device of claim 1 further comprising:
    an unwinding reel or reels for unwinding two metal strips to provide the two outer metal cover sheets;
    an unwinding reel for unwinding the plastic film; and
    means for preheating the plastic film and the two metal strips before the first laminating step.

3. The device of claim 1 further comprising:
    an unwinding reel for unwinding a metal strip to provide one of the two outer metal cover sheets;
    an unwinding reel for unwinding a metal strip with the plastic film laminated thereon at least on one side; and
    means for preheating the metal strip and the metal strip with the plastic film before the first laminating step.

4. The device of claim 1 further comprising:
    an unwinding reel or reels for unwinding two metal strips to provide the two outer metal cover sheets;
    an unwinding reel for unwinding the plastic film;
    a first means for preheating a first of the two metal strips and the plastic film prior to a laminating-on step wherein the plastic film is laminated onto at least one side of the first of the two metal strips; and
    a second means for preheating a second of the two metal strips and the first of the two metal strips with the plastic film laminated thereon, with the second means for preheating positioned between the first means for preheating and the first laminating step.

5. The device of claim 1 further comprising means for heating the two outer metal cover sheets downstream of the first laminating gap.

6. The device of claim 5 wherein the means for heating the two outer metal cover sheets downstream of the first laminating gap comprise radiative heating means, lasers, or LEDs.

7. The device of claim 1 further comprising a heat tunnel in the first heating zone, wherein the plastic film and the two outer metal cover sheets are at least one of radiatively, inductively, or convectively heated to the laminating temperature in the heat tunnel.

8. The device of claim 1 further comprising a double belt press disposed in the first heating zone for conductively heating the plastic film and the two outer metal cover sheets.

9. The device of claim 1 wherein the cooling zone comprises a double belt press, an air cooling section, a water mist cooling section, a water cooling section, or a combination of the cooling sections.

10. The device of claim 1 further comprising strip-guiding means for guiding the two outer metal cover sheets for preheating through the first heating zone downstream of the first laminating gap.

11. The device of claim 1 wherein means for preheating the plastic film are disposed directly upstream of the laminating gap of the first laminating device.

12. The device of claim 1 further comprising a second heating zone and a third laminating device disposed on an output side of the second heating zone, wherein the third laminating device comprises two laminating rolls forming a laminating gap, with the third laminating device being disposed upstream of the cooling zone.

13. The device of claim 1 wherein the two laminating rolls of at least one of the first laminating device or the second laminating device are temperature-adjustable.

14. A method for producing a strip-shaped composite sheet comprising a plastic layer disposed between two metal cover sheets, the method comprising:
    providing two metal strips and a plastic film by way of unwinding reels;
    preheating the two metal strips and the plastic film before the two metal strips and the plastic film are supplied to a first laminating device with a laminating gap formed by two laminating rolls;
    laminating the two metal strips with the plastic film positioned between the two metal strips in the first laminating device to form a composite sheet;

heating the composite sheet in a first heating zone downstream of the first laminating gap to a laminating temperature;

subjecting the composite sheet to a second laminating step in a second laminating device with a laminating gap formed by two laminating rolls; and cooling the composite sheet in a cooling zone.

15. The method of claim 14 further comprising radiatively heating the two metal cover sheets after the two metal strips pass through the first laminating gap.

16. The method of claim 14 further comprising passing the composite sheet through a second heating zone and a third laminating device disposed on an output side of the second heating zone before cooling the composite sheet in the cooling zone.

17. The method of claim 14 wherein the two metal strips are guided for preheating through the first heating zone, which is disposed downstream of the first laminating gap, and laminated in the first laminating gap to form the composite sheet.

18. The method of claim 14 wherein the plastic film is heated to a temperature of between 50° C. and 150° C. directly before the plastic film enters the first laminating gap.

19. The method of claim 14 further comprising adjusting a temperature of the two laminating rolls of at least one of the first laminating device or the second laminating device to a temperature of the two heated metal strips before laminating.

* * * * *